(12) United States Patent
Lin

(10) Patent No.: US 11,487,552 B2
(45) Date of Patent: Nov. 1, 2022

(54) BLADE SERVER

(71) Applicant: LENOVO Enterprise Solutions (Singapore) PTE. LTD., NewTech Park (SG)

(72) Inventor: Hui Lin, Shanghai (CN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 179 days.

(21) Appl. No.: 16/437,427

(22) Filed: Jun. 11, 2019

(65) Prior Publication Data
US 2019/0391816 A1    Dec. 26, 2019

(30) Foreign Application Priority Data
Jun. 25, 2018  (CN) .......................... 201810661163.2

(51) Int. Cl.
*G06F 9/4401* (2018.01)
*G06F 8/61* (2018.01)

(52) U.S. Cl.
CPC ............... *G06F 9/441* (2013.01); *G06F 8/61* (2013.01); *G06F 9/4416* (2013.01)

(58) Field of Classification Search
CPC .............................. G06F 9/4441; G06F 9/4416
See application file for complete search history.

(56) References Cited

U.S. PATENT DOCUMENTS

| | | | | |
|---|---|---|---|---|
| 6,810,478 B1 * | 10/2004 | Anand | .................. | G06F 15/177 713/1 |
| 7,356,679 B1 * | 4/2008 | Le | .................. | G06F 9/45558 713/1 |
| 7,584,348 B1 * | 9/2009 | Draper | ................ | G06F 9/44505 713/1 |
| 8,615,566 B1 * | 12/2013 | Tu | ...................... | G06F 11/2025 709/219 |
| 9,037,843 B2 * | 5/2015 | Lyons | .................... | G06F 9/452 713/2 |
| 9,465,625 B2 * | 10/2016 | Gopalakrishnan | .... | G06F 9/4416 |
| 9,805,068 B1 * | 10/2017 | Sabjan | ................ | G06F 11/1417 |
| 2005/0114682 A1 * | 5/2005 | Zimmer | ................ | G06F 21/575 713/187 |
| 2008/0091929 A1 * | 4/2008 | Oberhaus | .............. | G06F 9/4416 713/1 |
| 2008/0155245 A1 * | 6/2008 | Lipscombe | ........... | G06F 9/4416 713/2 |
| 2009/0222498 A1 * | 9/2009 | Lu | ........................... | G06F 16/10 |
| 2010/0250910 A1 * | 9/2010 | Watanabe | ........... | G06F 11/1461 713/2 |

(Continued)

*Primary Examiner* — Phil K Nguyen
(74) *Attorney, Agent, or Firm* — Kunzler Bean & Adamson; Bruce R. Needham (57) ABSTRACT

A blade server with an apparatus for configuring the blade server is disclosed. the blade server includes at least one data processor and the data processor is configured to determine presence of a response file at a remote management module, upon deployment of the blade server, in response to the response file being present, receive the response file from the remote management module, and retrieve an ISO of a desired operating system for the blade server in accordance with data stored in the response file, in order to install the desired operating system for the blade server.

18 Claims, 3 Drawing Sheets

(56) References Cited

U.S. PATENT DOCUMENTS

| | | | |
|---|---|---|---|
| 2010/0325410 A1* | 12/2010 | Fitzgerald | G06F 8/64 |
| | | | 713/2 |
| 2013/0139183 A1* | 5/2013 | Mallur | G06F 8/63 |
| | | | 719/321 |
| 2013/0179558 A1* | 7/2013 | Lin | H04W 4/50 |
| | | | 709/223 |
| 2015/0006951 A1* | 1/2015 | Gurram | G06F 11/2028 |
| | | | 714/4.12 |
| 2016/0335066 A1* | 11/2016 | Zhang | G06F 8/61 |
| 2017/0109176 A1* | 4/2017 | Shih | G06F 9/4406 |
| 2017/0201419 A1* | 7/2017 | Garcia | H04W 8/26 |
| 2019/0155614 A1* | 5/2019 | York | G06F 9/4416 |

* cited by examiner

BLADE SERVER

CROSS-REFERENCE TO RELATED APPLICATIONS

This patent application claims priority to China Patent Application No. 201810661163.2 filed on Jun. 25, 2018 for Hui Lin, the entire contents of which are incorporated herein by reference for all purposes.

FIELD

The subject matter disclosed herein relates to blade servers, particularly in relation to an installation of a desired operating system for the blade servers.

BACKGROUND

When setting up a new data center or when replacing a plurality of blade servers, one of the most time consuming tasks relate to installation of appropriate/desirable operating systems (OS) for respective blade servers.

One way of carrying out the required installation is by using manual installation for each blade server. A typical manual process includes using storage media containing the OS or by mounting of an OS ISO image (hereinafter "ISO" or "OS ISO"), and carrying out the OS installation manually. Unfortunately, this process is time consuming, and can be confusing and prone to error when different OS' are required for different blade servers.

Another way of carrying out the required installation is by using a pre-boot execution environment (PXE) solution. A typical process with this solution involves configuring a dynamic host configuration protocol (DHCP) server and file server to enable booting up with a PXE boot agent. It should be noted that configuration of the DHCP server and the file server is not straight-forward, and further inconvenience arises from building the PXE boot agent.

Yet another way of carrying out the required installation is by using PXE extensions. A typical process involves use of a central management utility to mount the boot agent to all the new blade servers. Once the blade servers are mounted to a chassis, the blade servers access the management network which enables the boot agent to be mounted. Yet again, inconveniences arise from building the boot agents for different OS' required for different blade servers.

It is evident that there are shortcomings in the current solutions.

BRIEF SUMMARY

A blade server with an apparatus for configuring the blade server is disclosed. the blade server includes at least one data processor and the data processor is configured to determine presence of a response file at a remote management module, upon deployment of the blade server, in response to the response file being present, receive the response file from the remote management module, and retrieve an ISO of a desired operating system for the blade server in accordance with data stored in the response file, in order to install the desired operating system for the blade server.

A method for installation of a desired operating system for a blade server includes the blade server receiving a response file from a remote management module, upon deployment of the blade server, the blade server retrieving an ISO of a desired operating system in accordance with data stored in the response file, and installing the desired operating system for the blade server.

A program product is disclosed with a computer readable storage medium that stores code executable by a processor for installation of a desired operating system for a blade server, the executable code comprising code to determine presence of a response file at a remote management module, upon deployment of the blade server, in response to the response file being present, receive the response file from the remote management module, and retrieve an ISO of a desired operating system for the blade server in accordance with data stored in the response file, in order to install the desired operating system for the blade server.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

A blade server with an apparatus for configuring the blade server is disclosed. the blade server includes at least one data processor and the data processor is configured to determine presence of a response file at a remote management module, upon deployment of the blade server, in response to the response file being present, receive the response file from the remote management module, and retrieve an ISO of a desired operating system for the blade server in accordance with data stored in the response file, in order to install the desired operating system for the blade server.

In some embodiments, the data processor is further configured to transmit a notification signal to the remote management module upon the deployment of the blade server, transmit information to the remote management module upon the installation of the desired operating system, and update the data in the response file. In other embodiments, the response file is preconfigured at the chassis management module. In other embodiments, the data processor is further configured to transmit the response file from the blade server. The response file is either a pre-set response file or resultant from retrieval of data from the remote management module. In other embodiments, the response file is input at the chassis management module. In other embodiments, settings of the blade server are configured in accordance with the data stored in the response file, the settings including firmware and RAID settings.

In some embodiments, the data processor is a baseboard management controller. In further embodiments, the ISO is mounted at the baseboard management controller. In other embodiments, the response file includes parameters selected from a group consisting of: basic input/output settings (BIOS) setup settings, BMC settings, RAID volume settings, OS ISO location, and settings for OS installation. In other embodiments, the blade server is configured to have identical settings to a preceding blade server being replaced by the blade server. In other embodiments, the blade server is configured to have settings as part of a new server array. In other embodiments, the data processor includes a set-up module where the set-up module is operable to be launched by the response file.

A method for installation of a desired operating system for a blade server includes the blade server receiving a response file from a remote management module, upon deployment of the blade server, the blade server retrieving an ISO of a desired operating system in accordance with data stored in the response file, and installing the desired operating system for the blade server.

In some embodiments, the method includes transmitting, from the blade server, a notification signal to the remote management module, transmitting, from the blade server, information to the remote management module upon the installation of the desired operating system, and updating settings stored in the response file. In other embodiments, the response file is preconfigured at the chassis management module. In other embodiments, the notification signal is provided by a baseboard management controller, and the response file is received at the baseboard management controller. In other embodiments, the ISO is mounted at the baseboard management controller.

In some embodiments, the method includes transmitting, from the blade server, the response file, where the response file is either a pre-set response file or resultant from retrieval of data from the remote management module. In other embodiments, settings of the blade server are configured in accordance with the data as stored in the response file, the settings including firmware and RAID settings.

A program product is disclosed with a computer readable storage medium that stores code executable by a processor for installation of a desired operating system for a blade server, the executable code comprising code to determine presence of a response file at a remote management module, upon deployment of the blade server, in response to the response file being present, receive the response file from the remote management module, and retrieve an ISO of a desired operating system for the blade server in accordance with data stored in the response file, in order to install the desired operating system for the blade server.

It will be appreciated that the broad forms of the invention and their respective features can be used in conjunction, interchangeably and/or independently, and reference to separate broad forms is not intended to be limiting.

Embodiments of the present invention provide users with a blade server and method for installing a desired operating system (OS) on the blade server. Whenever a blade server is mounted to a rack (either for the first time, or as a replacement blade server), the user does not need to be concerned about the desired/required OS for the newly mounted blade server, as the blade server will be configured to install the desired OS. Furthermore, embodiments of the present invention also provide users with a way to maintain a system configuration for an array of blade servers, since replacement/repair of any of the array is a straight-forward process of replacement of a blade server(s) and consequently followed by installation of the desired OS for the blade server(s).

An example of a system 100 for installation of a desired OS for a blade server 115 will now be described with reference to FIG. 1.

In this example, the system 100 includes a chassis management module (CMM) 110. The CMM 110 can be integral with a rack for mounting a plurality of blade servers. In some examples, the CMM 110 can be remote from the rack. The system 100 also includes at least one blade server 115, the blade server 115 being communicatively connected to the CMM 110 and a communications network 150. The connection between the CMM 110 and the blade server 115 can be by a cabled connection or a wireless connection via the communications network 150.

The communications network 150 can be of any appropriate form, such as the Internet and/or a number of local area networks (LANs), direct or point-to-point connections, such as Bluetooth, or the like. The communications network 150 can enable an OS ISO file 135 to be transmitted from a remote storage source to the blade server 115.

Figure 1:
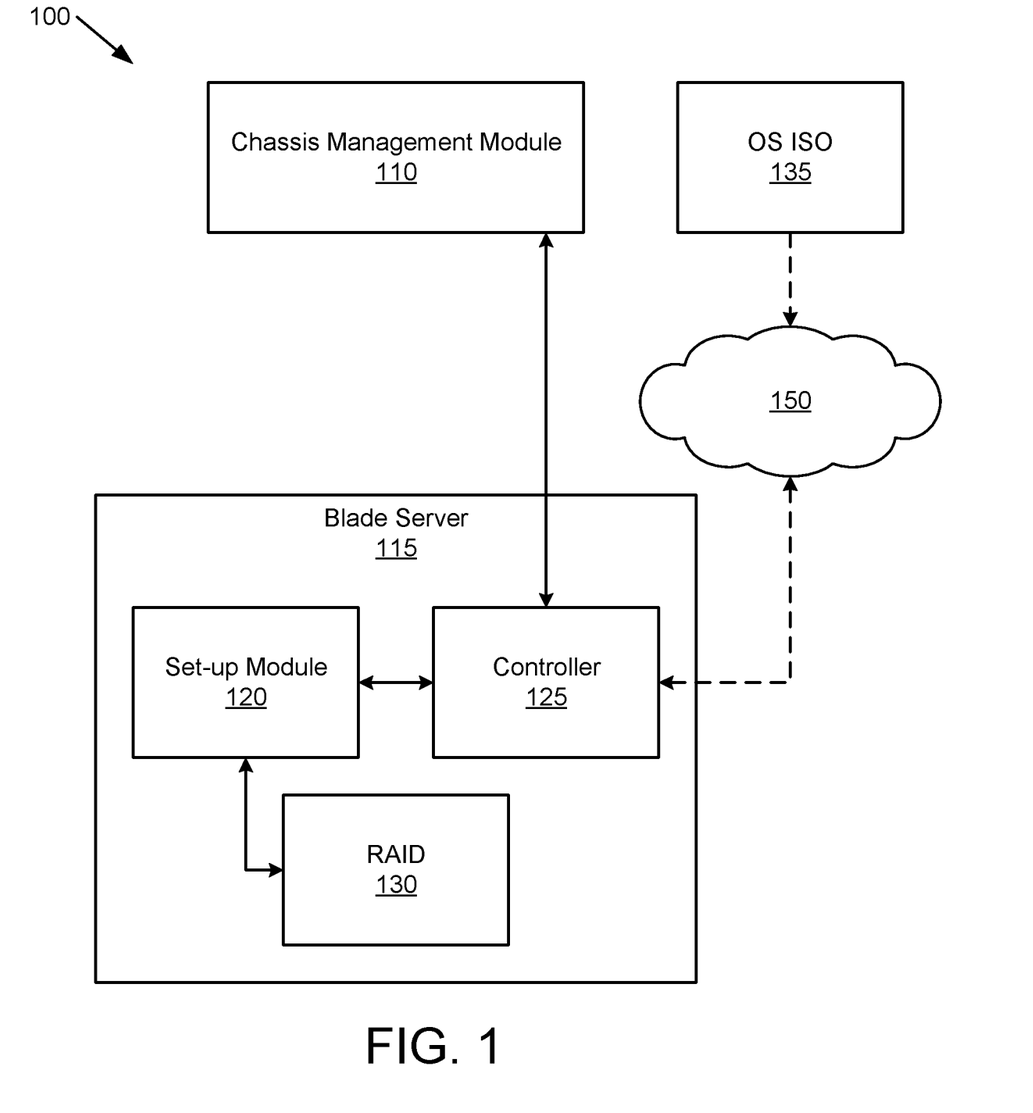
FIG. 1 is a schematic view of a system for installation of a desired operating system for a blade server.

An exemplary embodiment of the blade server 115 is shown in FIG. 1. As shown, the blade server 115 includes the following components in electronic communication:
  a controller 125;
  a set-up module 120; and
  a redundant array of independent disks (RAID) 130.

One example of the controller 125 is a Baseboard Management Controller (BMC), whereas an example of the set-up module 120 is the Lenovo® XClarity® Provisioning Manager (LXPM). The LXPM is a Unified Extensible Firmware Interface (UEFI) application embedded tool.

Although the components depicted in FIG. 1 represent physical components, FIG. 1 is not intended to be a hardware diagram; thus, many of the components depicted in FIG. 1 may be realized by common constructs or distributed among additional physical components. Moreover, it is certainly contemplated that other existing and yet-to-be developed physical components and architectures may be utilized to implement the functional components described with reference to FIG. 1.

The blade server 115 is preferably encased in a chassis, whereby the chassis can be configured to be mounted to a rack. It should be appreciated that the chassis is able to ensure transmission of heat to prevent over-heating of the blade server 115.

The controller 125 can be configured to transmit/receive instructions to/from both the CMM 110 and the set-up module 120. The controller 125 typically includes at least one data processor for processing of the instructions. In addition, the controller 125 can also include random access memory (RAM) which is realized by flash memory (for example, NAND or NOR memory), but it is certainly contemplated that other memory types may be utilized as well. In general, the RAM functions to store data and executable code received by and/or required by the controller 125 to carry out desired tasks. In some embodiments, for example, RAM includes software code to facilitate the implementation of one or more portions of the desired method. Furthermore, the controller 125 can also include at least one transceiver component, which may be used for communicating with external devices via the communications network 150.

The set-up module 120, in some embodiments, is configured to provide a user interface for setting up the blade server 115. The set-up module 120 can be used to, for example:
  determine information about devices that are installed in the blade server 115;
  update the system firmware for the blade server 115;
  configure the system firmware;
  run diagnostic tests for the devices that are installed in the blade server 115; and
  set-up RAID volume for the OS deployment for the blade server 115.

Finally, the RAID 130 refers to a plurality of storage devices that are installed in the blade server 115. The plurality of storage devices is configured in a manner to optimize both the reading of data and the writing of data at the plurality of storage devices. The RAID 130 is typically non-volatile computer readable storage media. In other embodiments, the blade server 115 includes other non-volatile computer readable storage media, which may or may not be configured in a RAID. In some embodiments, the blade server 115 does not include a RAID 130, but includes other non-volatile computer readable storage media.

Figure 2:
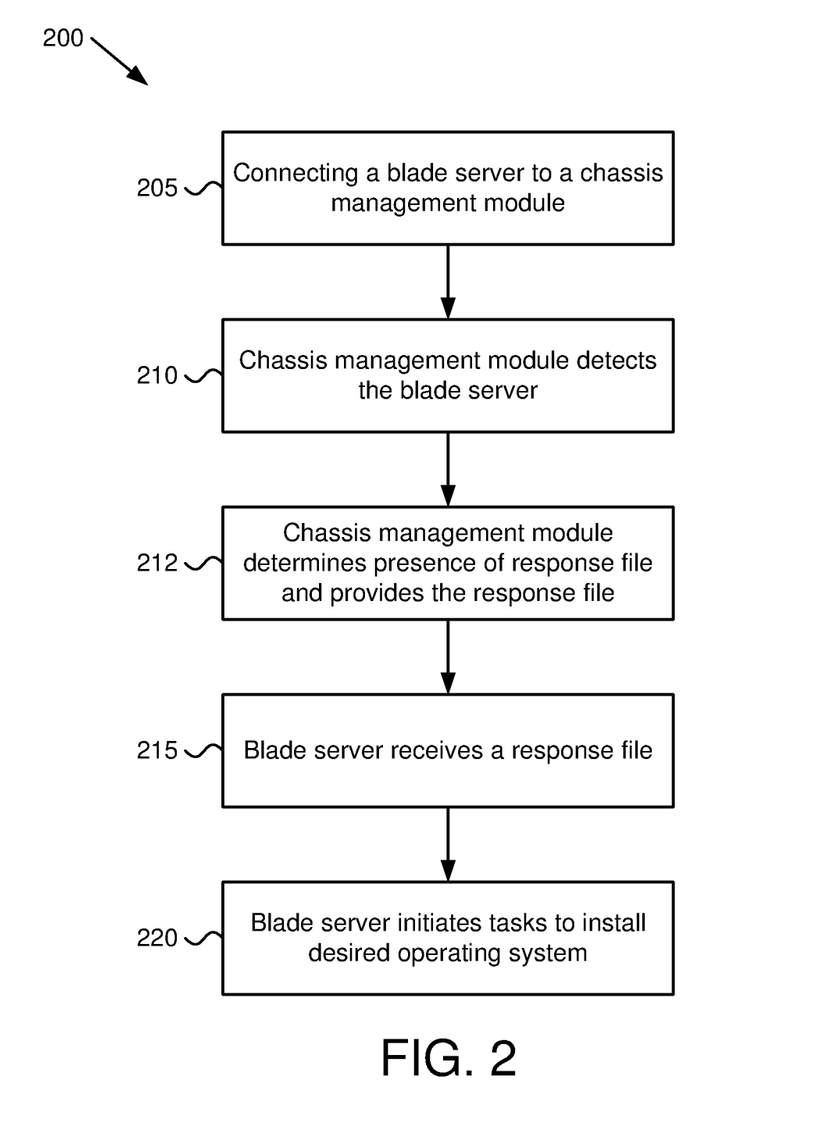
FIG. 2 is a flow chart of a first example for a method for installation of a desired operating system for a blade server.

A first example of a method 200 to install a desired OS for a blade server 115 will now be described with reference to FIG. 2. The method 200 can be carried out using the system 100, but it need not be restricted to only with the use of the system 100. It should be appreciated that aspects of the method 200 can be carried out by at least one data processor, possibly with a non-transitory computer readable storage medium embodying thereon a program of computer readable instructions.

At step 205, a blade server 115 is connected to a chassis management module (CMM) 110, whereby the connection is a communicative connection and/or network 150 and can be via a cabled connection, a wireless connection, or combination thereof. The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an Adaptive Network Topology (ANT®) and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

Connection of the blade server 115 to the CMM 110 can also be known as deployment. The CMM 110 can be located at a rack for housing a plurality of blade servers, or the CMM 110 can be at a remote location.

Subsequently, at step 210, the CMM 110 detects the blade server 115 once the blade server 115 is communicatively connected to the CMM 110. The CMM 110 can be configured to detect the blade server 115 when it receives a notification signal from the blade server 115.

At step 212, the CMM 110 determines if there is an associated response file for the blade server 115 connected to the CMM 110, and provides the response file. The response file can be associated with the blade server 115 using, for example, a serial number of the blade server 115. If there is no associated response file, the CMM 110 is able to determine that the blade server 115 is not a replacement blade server 115, and if there is an associated response file, the CMM 110 is able to determine that the blade server 115 is a replacement blade server 115. If there is no associated response file, an associated response file can be, for example, configured by a user and input to the CMM 110, obtained from the connected blade server 115 which provides a factory/pre-set response file, obtained from the connected blade server 115 after the connected blade server 115 retrieves data (for example, blade server location, desired RAID settings and the like) from the CMM 110, etc.

Typically, the response file includes parameters such as, for example, BIOS setup settings, BMC settings, RAID volume settings, OS ISO location, settings for OS installation (keyboard, language, time zone, network configuration and the like), and so forth.

Consequently, at step 215, the blade server 115 receives a response file from the CMM 110. Typically, the response file is configured to launch a set-up module 120 of the blade server 115 once the response file is activated at the blade server 115.

Launching of the set-up module 120 is carried out at step 220, when the blade server 115 initiates tasks to install a desired OS. In some embodiments, the tasks being carried out include mounting an ISO of the desired OS, and subsequently installing the desired OS using the ISO.

In some embodiments, there can be a file server location where the OS ISO 135 is stored, whereby the response file includes information of the file server location. The file server location can be, for example, a Windows® shared folder, a Linux® network file system (NFS), and so forth. Correspondingly, when the set-up module 120 is launched, it will process/parse the response file to obtain the location of the OS ISO 135. Then, the set-up module 120 will send requisite instructions to the BMC (or controller 125) on the blade server 115 to request the BMC to mount the OS ISO 135 to a host system (Intel CPU) of the blade server 115 (as per typical functionality of a BMC). Once the OS ISO 135 is mounted, the set-up module 120 obtains relevant OS settings for the installation in the response file and triggers an OS installer (in the OS ISO 135) to install an appropriate OS with the relevant settings. There can be multiple response files, each response file being for one location of the blade server 115 or for a particular model/configuration of a blade server 115.

It should be noted that embodiments of the method 200 provide users with a method for installing a desired OS on a blade server 115, regardless of whether the blade server 115 is a replacement blade server 115 or part of a newly configured blade server array. Whenever a blade server 115 is mounted to a rack, the user does not need to be concerned about the desired/required OS for the newly mounted blade server 115, as the blade server 115 will be configured to install the desired OS. Furthermore, users are also provided with a way to maintain a system configuration for an array of blade servers, since replacement/repair of any of the array is a straight-forward process of replacement of a blade server(s) and consequently followed by installation of the desired OS for the blade server(s).

Figure 3:
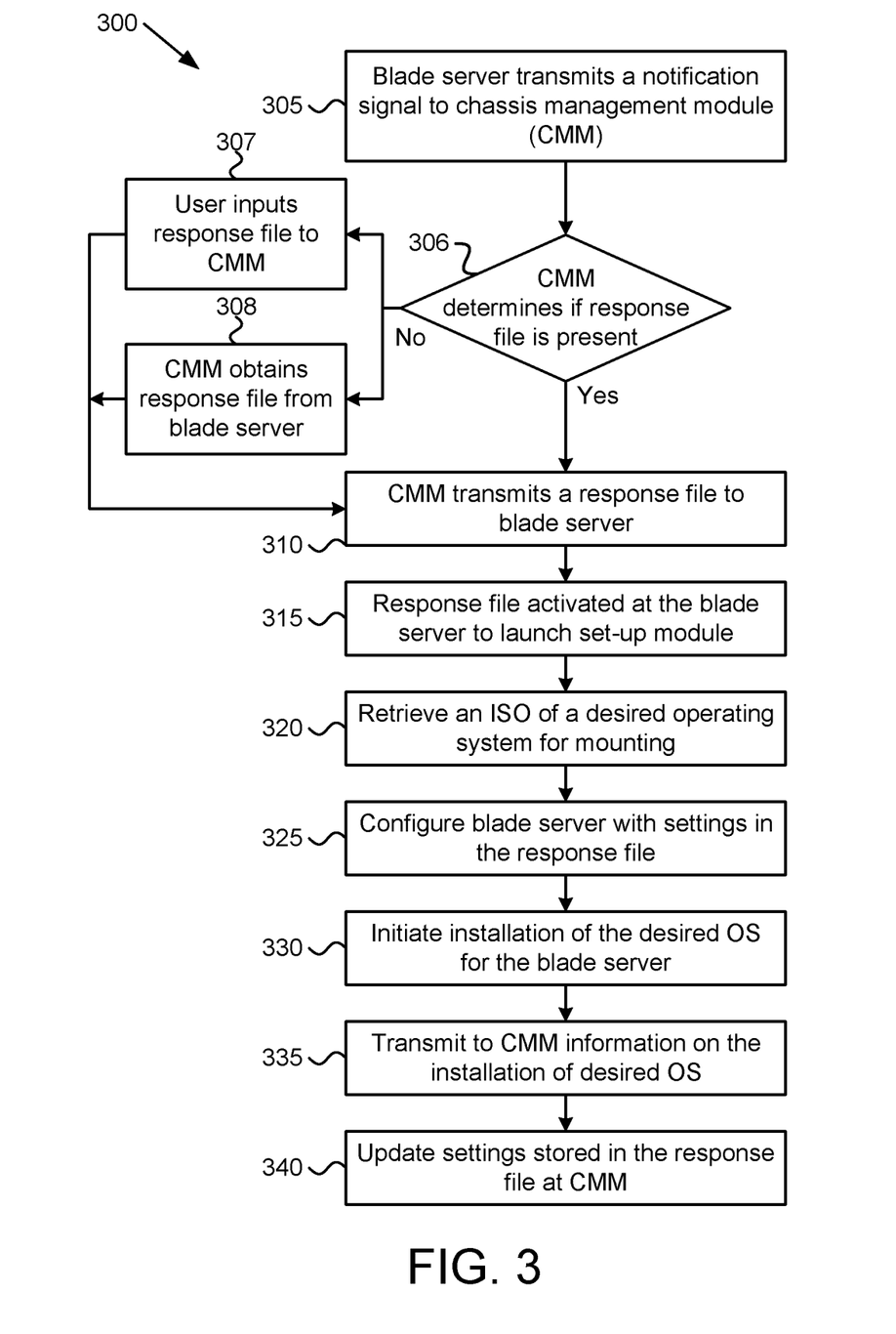
FIG. 3 is a flow chart of a second example for a method for installation of a desired operating system for a blade server.

A second example of a method 300 to install a desired OS for a blade server 115 will now be described with reference to FIG. 3. The method 300 can be carried out using the system 100, but it need not be restricted to only with the use of the system 100. It should be appreciated that aspects of the method 300 can be carried out by at least one data processor, possibly with a non-transitory computer readable storage medium embodying thereon a program of computer readable instructions.

At step 305, upon mounting to a rack for housing a plurality of blade servers, a blade server 115 transmits a notification signal to a CMM 110. The CMM 110 detects the blade server 115 upon receipt of the notification signal. The notification signal can be provided by a baseboard management controller of the blade server 115.

The blade server 115 is connected to the CMM 110, whereby the connection is a communicative connection and can be via either a cabled connection and/or a wireless connection. Connection of the blade server 115 to the CMM 110 can also be known as deployment. The CMM 110 can be located at the rack, or it can be at a remote location.

At step 306, the CMM 110 determines if an associated response file is present. The response file can be associated with the blade server 115 using, for example, a serial number of the blade server 115. If the associated response file is detected, step 310 follows.

If there is no associated response file, the CMM 110 is able to determine that the blade server 115 is not a replacement blade server 115, and if there is an associated response file, the CMM 110 is able to determine that the blade server 115 is a replacement blade server. If the response file is not present, either step 307 or step 308 can occur.

Typically, the response file includes parameters such as, for example, BIOS setup settings, BMC settings, RAID volume settings, OS ISO location, settings for OS installation (keyboard, language, time zone, network configuration and the like), and so forth.

At step 307, the associated response file is configured by a user and input to the CMM 110. As an alternative to step 308, the associated response file is obtained from the blade server 115 which provides a factory/pre-set response file, or from the blade server 115 which retrieves data (for example, blade server location, desired RAID settings and the like) from the CMM 110 and subsequently provides a response file to the CMM 110.

At step 310, the CMM 110 transmits the response file to the blade server 115, specifically, at the baseboard management controller or similar controller 125. The response file is typically configured to launch a set-up module 120 of the blade server 115 once the response file is activated at the blade server 115. The response file can be definable at the CMM 110. In some examples, the response file defines the desired OS for the blade server 115. At step 315, the response file is activated to launch the set-up module 120.

Subsequently, at step 320, an ISO of a desired OS is retrieved for mounting at the blade server 115, specifically at the baseboard management controller. The ISO can be retrieved from any remote storage source communicatively accessible via a data network 150.

In addition, at step 325, the blade server 115 is configured using the set-up module 120 in accordance with settings stored in the response file. For example, the settings can include firmware versions, RAID configurations and the like. Typically, the settings for a subsequent blade server are identical to a preceding blade server which is being replaced.

Subsequently, at step 330, the set-up module 120 then initiates the installation of the desired OS for the blade server 115 using the ISO. Consequently, at step 335, information on the installation of the desired OS is transmitted to the CMM 110 and this causes, at step 340, an updating of settings stored in the response file for the blade server 115 at the CMM 110. With the update of the settings, up-to-date information of the blade server 115 is available for subsequent use where necessary.

In some embodiments, there can be a file server location where the OS ISO 135 is stored, whereby the response file includes information of the file server location. The file server location can be, for example, a Windows® shared folder, a Linux® network file system (NFS), and so forth. Correspondingly, when the set-up module 120 is launched, it will process/parse the response file to obtain the location of the OS ISO 135. Then, the set-up module 120 will send requisite instructions to the BMC (e.g. controller 125) on the blade server 115 to request the BMC to mount the OS ISO 135 to a host system (Intel CPU) of the blade server 115 (as per typical functionality of a BMC or similar controller 125). Once OS ISO 135 is mounted, the set-up module 120 obtains relevant OS settings for the installation in the response file and triggers an OS installer (in the OS ISO 135) to install an appropriate OS with the relevant settings. There can be multiple response files, each response file being for one location of the blade server 115 or for a particular model/configuration of a blade server 115.

It should be appreciated that the method 300 can be viewed as a more detailed version of the method 200, and as such, the user of the method 300 is also able to enable the user to be unconcerned about the desired/required OS for the newly mounted blade server 115, as the blade server 115 will be configured to install the desired OS, regardless of whether the blade server 115 is a replacement blade server or part of a newly configured blade server array. Plus, users are also able to maintain a system configuration for an array of blade servers in a convenient manner.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope of the invention.

What is claimed is:

1. A blade server, comprising at least one data processor, wherein the data processor is configured to:
   transmit, prior to installation of an operating system on the blade server, a notification signal to a remote management module remote from the blade server, wherein:
   the notification signal prompts the remote management module to:
     determine whether a response file is present at the remote management module, the response file comprising parameters selected from a group consisting of: BIOS setup settings, BMC settings, RAID volume settings, and settings for OS installation, wherein a presence of the response file on the remote management module indicates that the blade server is replacing a preceding blade server, wherein the response file present on the remote management module was previously updated by the preceding blade server being replaced by the blade server; and
     in response to determining that the response file is not present on the remote management module, the remote management module receives the response file from one of sources: (i) a user input, or (ii) a factory/pre-set response file obtained from the blade server; and
   the notification signal prompts the remote management module to transmit the response file to the blade server;
   receive the response file from the remote management module;
   retrieve an image of a desired operating system for the blade server in response to receiving the response file; and
   install the desired operating system on the blade server based on the parameters in the response file.

2. The blade server of claim 1, wherein the data processor is further configured to transmit updated configuration information to the remote management module for updating the parameters in the response file.

3. The blade server of claim 1, wherein the response file is preconfigured by the preceding blade server at a chassis management module in communication with the blade server prior to initial connection of the blade server to the remote management module.

4. The blade server of claim 1, wherein the response file is input at a chassis management module in communication with the blade server in response to the remote management module determining that a response file is not present at the remote management module.

5. The blade server of claim 1, wherein settings of the blade server are configured in accordance with the parameters included in the response file, the settings comprise firmware settings, and RAID settings where the blade server is connected to a plurality of storage devices are configured in a RAID array.

6. The blade server of claim 1, wherein the data processor is a baseboard management controller.

7. The blade server of claim 6, wherein the image is mounted by the baseboard management controller prior to retrieving the image of the desired operating system.

8. The blade server of claim 1, wherein, in response to the remote management module determining that a response file is present on the remote management module, the data processor is further configured to use information in the response file to issue commands to cause the blade server to have identical settings to a preceding blade server being replaced by the blade server.

9. The blade server of claim 1, wherein the data processor further comprises a set-up module, wherein the set-up module is operable to be launched by the response file, wherein the set-up module retrieves the image of the desired operating system and installs the desired operating system on the blade server.

10. The blade server of claim 1, wherein a non-presence of the response file at the remote management module indicates that the blade server is not replacing the preceding blade server.

11. A method for installation of a desired operating system for a blade server, the method comprising:
    the blade server transmitting, prior to installation of an operating system on the blade server, a notification signal to a remote management module remote from the blade server, wherein:
    the notification signal prompts the remote management module to:
      determine whether a response file is present on the remote management module, the response file storing parameters selected from a group consisting of: BIOS setup settings, BMC settings, RAID volume settings, and settings for OS installation, wherein a presence of the response file on the remote management module indicates that the blade server is replacing a preceding blade server, wherein the response file present on the remote management module was previously updated by the preceding blade server being replaced by the blade server; and in response to determining that the response file is not present on the remote management module, the remote management module receives the response file from one of sources: (i) a user input, or (ii) a factory/pre-set response file obtained from the blade server; and the notification signal prompts the remote management module to transmit the response file to the blade server;

the blade server receiving the response file from the remote management module; the blade server retrieving an image of a desired operating system in response to receiving the response file; and installing the desired operating system on the blade server based on the parameters stored in the response file.

12. The method of claim 11, further comprising transmitting, from the blade server, updated configuration information to the remote management module for updating the parameters stored in the response file.

13. The method of claim 11, wherein the response file is preconfigured at a chassis management module by the preceding blade server in communication with the blade server prior to initial connection of the blade server to the remote management module.

14. The method of claim 11, wherein the notification signal is provided by a baseboard management controller, and the response file is received at the baseboard management controller.

15. The method of claim 14, wherein the image is mounted by the baseboard management controller prior to retrieving the image of the desired operating system.

16. The method of claim 11, wherein settings of the blade server are configured in accordance with the parameters stored in the response file, the settings include firmware settings, and RAID settings where the blade server is connected to a plurality of storage devices are configured in a RAID array.

17. The method of claim 11, wherein a non-presence of the response file at the remote management module indicates that the blade server is not replacing the preceding blade server.

18. A program product comprising a non-transitory computer readable storage medium that stores code executable by a processor for installation of a desired operating system for a blade server, the executable code comprising code to:

transmit, prior to installation of an operating system on the blade server, a notification signal to a remote management module remote from the blade server, wherein:

the notification signal prompts the remote management module to:

determine whether a response file is present at the remote management module, the response file comprising parameters selected from a group consisting of: BIOS setup settings, BMC settings, RAID volume settings, and settings for OS installation, wherein a presence of the response file on the remote management module indicates that the blade server is replacing a preceding blade server, and wherein the response file present on the remote management module was previously updated by the preceding blade server being replaced by the blade server; and in response to determining that the response file is not present on the remote management module, the remote management module receives the response file from one of sources: (i) a user input, or (ii) a factory/pre-set response file obtained from the blade server; and the notification signal prompts the remote management module to transmit the response file to the blade server;

receive the response file from the remote management module;

retrieve an image of a desired operating system for the blade server in response to receiving the response file; and install the desired operating system on the blade server based on the parameters in the response file.

* * * * *